United States Patent
Wong et al.

(10) Patent No.: US 10,120,924 B2
(45) Date of Patent: Nov. 6, 2018

(54) QUARANTINE AND REPAIR OF REPLICAS IN A QUORUM-BASED DATA STORAGE SYSTEM

(71) Applicant: Akamai Technologies, Inc., Cambridge, MA (US)

(72) Inventors: Kai C Wong, Saratoga, CA (US); Philip A Lisiecki, Santa Barbara, CA (US); Sung Chiu, Los Altos, CA (US)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 299 days.

(21) Appl. No.: 14/543,507

(22) Filed: Nov. 17, 2014

(65) Prior Publication Data

US 2015/0278324 A1 Oct. 1, 2015

Related U.S. Application Data

(60) Provisional application No. 61/972,955, filed on Mar. 31, 2014.

(51) Int. Cl.
*G06F 17/30* (2006.01)
*G06F 11/08* (2006.01)

(52) U.S. Cl.
CPC ........ *G06F 17/30575* (2013.01); *G06F 11/08* (2013.01)

(58) Field of Classification Search
CPC ........................... G06F 11/08; G06F 17/30575
See application file for complete search history.

(56) References Cited

U.S. PATENT DOCUMENTS

| 7,472,178 | B2 | 12/2008 | Lisiecki et al. |
| 9,002,990 | B1 * | 4/2015 | Anand ................ H04L 67/2852 709/219 |
| 2012/0124001 | A1 * | 5/2012 | Shah ................ G06F 17/30578 707/634 |
| 2013/0080559 | A1 * | 3/2013 | Rao ..................... H04L 67/1097 709/208 |

(Continued)

FOREIGN PATENT DOCUMENTS

WO 2008013632 1/2008

OTHER PUBLICATIONS

Wayback Archive of BigCouch API web page, http://bigcouch.cloudantapi,available at https://web.archive.org/web/20131019205815/http://bigcouch.cloudant.api, dated Oct. 19, 2013 (archive downloaded Nov. 30, 2015), 2 pages.

(Continued)

*Primary Examiner* — Dinku W Gebresenbet

(57) ABSTRACT

A data storage system with quorum-based commits sometimes experiences replica failure, due to unavailability of a replica-hosting node, for example. Described herein are methods and systems for improving data persistence and availability in a distributed data store where data is stored in a plurality of shards and a given shard is replicated across a plurality of nodes so as to create a plurality of replicas, and a quorum of replicas is needed for access to the given shard. Among other things, the methods and systems generally involve determining whether to quarantine or delete unavailable replicas in a given shard, and how to handle purge requests related to the shard when there are quarantined replicas.

15 Claims, 4 Drawing Sheets

(56) References Cited

U.S. PATENT DOCUMENTS

2014/0095813 A1* 4/2014 Shukla .................. G06F 3/0611
711/154
2014/0129519 A1* 5/2014 Leshchiner ....... G06F 17/30578
707/613

OTHER PUBLICATIONS

Wayback Archive of web page Couchbase vs. Apache CouchDB, http://www.couchbase.com/couchbase-vs-couchdb, available at https://web.archive.org/web/20131228052903/http://www.couchbase.com/couchbase-vs-couchdb, dated Dec. 28, 2013 (archive Nov. 30, 2015), 3 pages.
Web page HTTP_view_API Couchdb, Wikihttp://wiki.apache.org/couchdb/HTTP_view_API, last edited Jun. 5 2013, (downloaded Nov. 30, 2015), 10 pages.
Web page, Introduction_to_CouchDB_views Couchdb Wiki, https://wiki.apache.org/couchdb/Introduction_to_CouchDB_views, last edited Jun. 5, 2013 (downloaded Nov. 30, 2015), 9 pages.
NoSQL, Wikipedia web page entry, dated Mar. 27, 2014, at https://en.wikipedia.org/w/index.php?title=NoSQL&oldid=601511474, (downloaded Nov. 30, 2015), 15 pages.
Web page, Scaling Out CouchDB with BigCouch, at http://nosql.mypopescu.com/post/1529034946/scalingoutcouchdbwithbigcouch, dated Nov. 9 2010, 2 pages.
Transcript of video on web page Scaling Out CouchDB with BigCouch, video available at http://nosql.mypopescu.com/post/1529034946/scalingoutcouchdbwithbigcouch, page dated Nov. 9, 2010, video dated Oct. 2010, 49 pages.
A. Kocoloski, Scaling CouchDB with BigCouch, O'Reilly Webcast, slides, Oct. 2010, 23 pages, available at http://www.slideshare.net/Cloudant/scaling-couchdb-with-bigcouch-5555464.
Wayback archive of web page Why NoSQL?, http://www.couchbase.com/whynosql/nosqldatabase, available at https://web.archive.org/web/20131106150835/http://www.couchbase.com/why-nosql/nosql-database, dated Dec. 28 2013 (downoaded Nov. 30, 2015), 7 pages.
Wayback Archive of web page Couchbase vs. Apache CouchDB, http://www.couchbase.com/couchbase-vs-couchdb, available at https://web.archive.org/web/20131228052903/http://www.couchbase.com/couchbase-vs-couchdb, dated Dec. 28, 2013 (downloaded Dec. 18, 2015) 3 pages.
Lo, J. et al., Active Nodal Task Seeking for High-Performance, Ultra-Dependable Computing, DoD Technical Information Semi-annual Report Jan. 15-Jul. 15, 1994, report date Jul. 1994, 29 pages, available through DTIC Online http://www.dtic.mil/get-tr-doc/pdf?AD=ADA282924; also published in IEEE Transactions on Aerospace & Electronic Systems, vol. 31, Issue No. 4, Oct. 1995, 29 pages.
Lo, J. et al., Ultra-Dependable, High-Performance, Real-Time Signal Processing, DoD Technical Information, Report Aug. 20, 1996, 63 pages, available through DTIC Online http://www.dtic.mil/docs/citations/ADA313491.
U.S. Appl. No. 14/451,172, filed Aug. 4, 2014.

\* cited by examiner

QUARANTINE AND REPAIR OF REPLICAS IN A QUORUM-BASED DATA STORAGE SYSTEM

CROSS REFERENCE TO RELATED APPLICATIONS

This application is based on and claims the benefit of priority of U.S. Application No. 61/972,955, filed Mar. 31, 2014, the teachings of which are hereby incorporated by reference in their entirety.

BACKGROUND

Technical Field

This application relates generally to data storage and more particularly to persistent, fault-tolerant data storage systems.

Brief Description of the Related Art

In a quorum-based data storage architecture, a data store is divided into multiple shards (also referred to as partitions) for parallel access. Replicas of each shard are stored in different nodes for improved persistency and fault tolerance, in the event of a node failure. The number of replicas per shard is typically configurable.

For read and write operations to a shard, a quorum of replicas is required. The quorum is the minimum number of replicas to successfully read or write data in order for a read or write operation to the shard to be considered successful. For example, assume that number of replicas per shard has been configured to be 5, and a quorum of 3 replicas is required for a successful operation. When a write operation returns a successful response, at least 3 of 5 replicas have the updated data. The other 2 replicas may have the data, but also may still be holding stale data or not have the data at all. Similarly, when a read operation returns a successful response, it means that at least 3 of 5 replicas had the same data, but the other 2 may not. If the other 2 replicas are alive, then eventually the data from the 3 replicas in the quorum that have the current data can be propagated over to other 2, enabling the replica set to achieve coherence.

When a shard is missing a quorum of replicas, for example due to a node failure or communication failure or other problem, then the entire shard is inaccessible because the quorum criteria cannot be met. Moreover, the most recently committed updates may be lost because those updates may be stored only in the write-successful replicas, which may be some or all of those that are missing.

To address this issue, missing replicas must be repaired. However, repairing missing replicas is challenging. For a high-performance data store, it is preferable that a repair occurs quickly, while maintaining data availability and persistency.

The teachings hereof address these technical challenges, among others, and provide a variety of benefits and improvements that will become apparent in view of this disclosure. The teachings hereof thus can provide improvements and benefits to the operation of distributed data storage technologies themselves, and in particular to replicated, quorum-based data storage, including distributed databases. The teachings hereof can be used to improve the operation of such systems, including in particular the data persistence and availability in such data storage systems.

BRIEF DESCRIPTION OF THE DRAWINGS

The teachings hereof will be more fully understood from the following detailed description taken in conjunction with the accompanying drawings, in which.

DETAILED DESCRIPTION

Figure 1A:
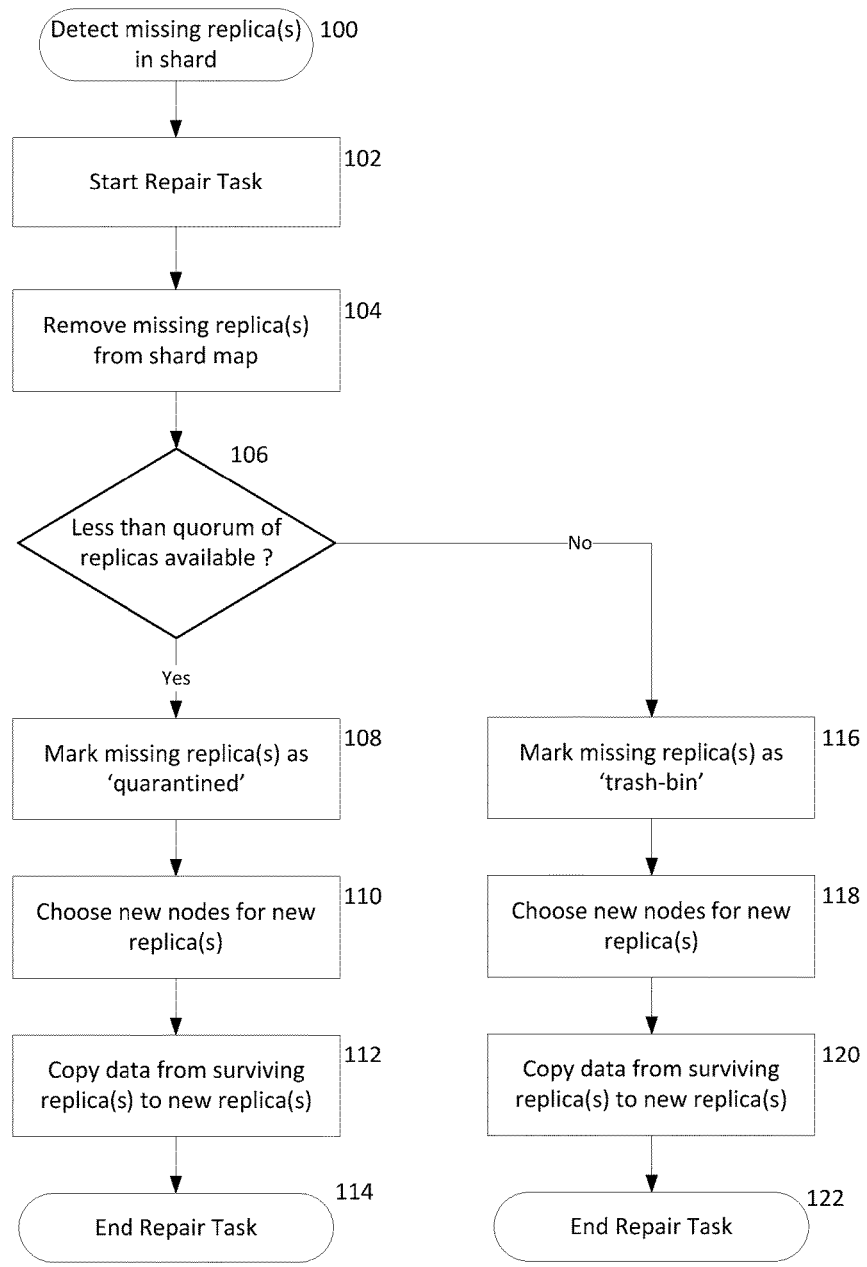
FIG. 1A is a flow diagram illustrating an embodiment of a computer data storage technique providing repair task.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this document, the term "e.g." is used as an abbreviation for the non-limiting phrase "for example."

Introduction

By way of non-limiting example, consider a data storage system in the form of a distributed database that has multiple nodes and that provides sharding and replication, with quorum-based access. Assume the database is broken into shards, and each shard is replicated with a set of N replicas, where N>1 and there is one replica in each of N nodes, as is typical. Note that the term 'node' is used to refer to a physical computer machine (implemented in hardware with or without software), or a virtual machine instance executing on such a physical computing machine, or equivalent. One or more nodes run management processes, including monitoring, task recognition/assignment and similar processes, to manage the operation of the system.

Preferably, one or more processes run (e.g., in a management node) to monitor the health of the nodes in the database cluster, detecting when a node fails or is unreachable for some period of time. When a node is down or unreachable for some period of time 't', the replicas in that node are considered to be missing. The unavailable replicas must be repaired so that a complete set of replicas is available for quorum-based operation. Repair typically involves replicating shard data from a surviving replica to nodes chosen to replace the unavailable replicas.

A repair can be initiated by inserting a repair task into a task table maintained on one or more of the nodes. A worker on of the nodes can sign up for this task (or, alternatively, a leader process can assign the repair task to a worker). Any worker in the system may take responsibility to perform the task. Note that the term worker is used to include a process, thread, managed sequence of instructions, or equivalent, that executes on a node. Depending on machine, processor and operating system configuration, a node may host one worker or multiple workers.

Repair Task and Quarantining

In general, a repair task can proceed as follows. The responsible worker chooses available node(s) that will replace the failed node(s) and will store new replicas. The worker removes the unavailable replicas from the shard map and disconnects the unavailable node/replica(s) to prevent them from coming back and disrupting the database service. These outgoing replicas are marked "in trash-bin." The worker replicates shard data from a surviving replica in the shard to the chosen new node(s) so as to create the new replicas. When replications are completed, the new replica(s) are added to the shard map to enable synchronization among shard replicas and proper database operations for the shard. If and when the down nodes/replicas eventually become available ("alive"), the replicas contained in them are marked "in trash-bin", so that data can be erased and storage space reclaimed on those formerly down nodes, which are no longer being used for the shard. This "trash-bin" operation is designed to prevent the outdated data from interfering with proper database operation.

If a repair task is performed when a quorum of replicas are still available, data availability is continuous and committed updates to the data (e.g., from before or during the repair task) are not lost.

However, if a quorum of replicas is not available at the time of the repair task—that is, more than the quorum of replicas is unavailable—then the shard cannot be accessed until a successful repair is made. Moreover, committed updates may be lost, if unavailable replicas are marked as "in trash-bin" in a repair task, e.g., because those replicas may hold updates that are not in the surviving replicas.

To address this issue, the unavailable replicas of a shard that is missing a quorum of replicas are preferably marked "quarantined"—rather than "in trash-bin" as explained previously. The quarantined replicas may contain potentially unique data not present in the surviving replicas, and so the unavailable replicas should not be erased or trashed until this data is retrieved.

Thus, in an embodiment, a worker performing a repair task determines whether a shard is missing a quorum of replicas or more. If not, then the repair can proceed as explained previously. But if so, then the worker marks the unavailable replicas as "quarantined" in the shard map. For availability, the worker can then continue with the repair operation as explained previously, except of course that "quarantined" replicas are not marked "in trash-bin". FIG. 1A illustrates an embodiment of the logic.

With reference to FIG. 1A, at step 100, the system detects that one or more replicas are unavailable, e.g., as a result of a communication failure, error, or health monitoring. A repair task is started (102), and the missing replicas are removed from the shard map (104). At 106, if a quorum of replicas are available, then the missing replicas can be marked as "trash-bin" (116), new nodes are chosen to host new replicas (118), the new replicas can be synced with the surviving quorum of replicas (120), and the repair task ends (122). At 106, if less than a quorum of replicas are available, then the procedure differs in that the missing replicas are marked "quarantined" rather than "trash-bin" (108).

Figure 1B:
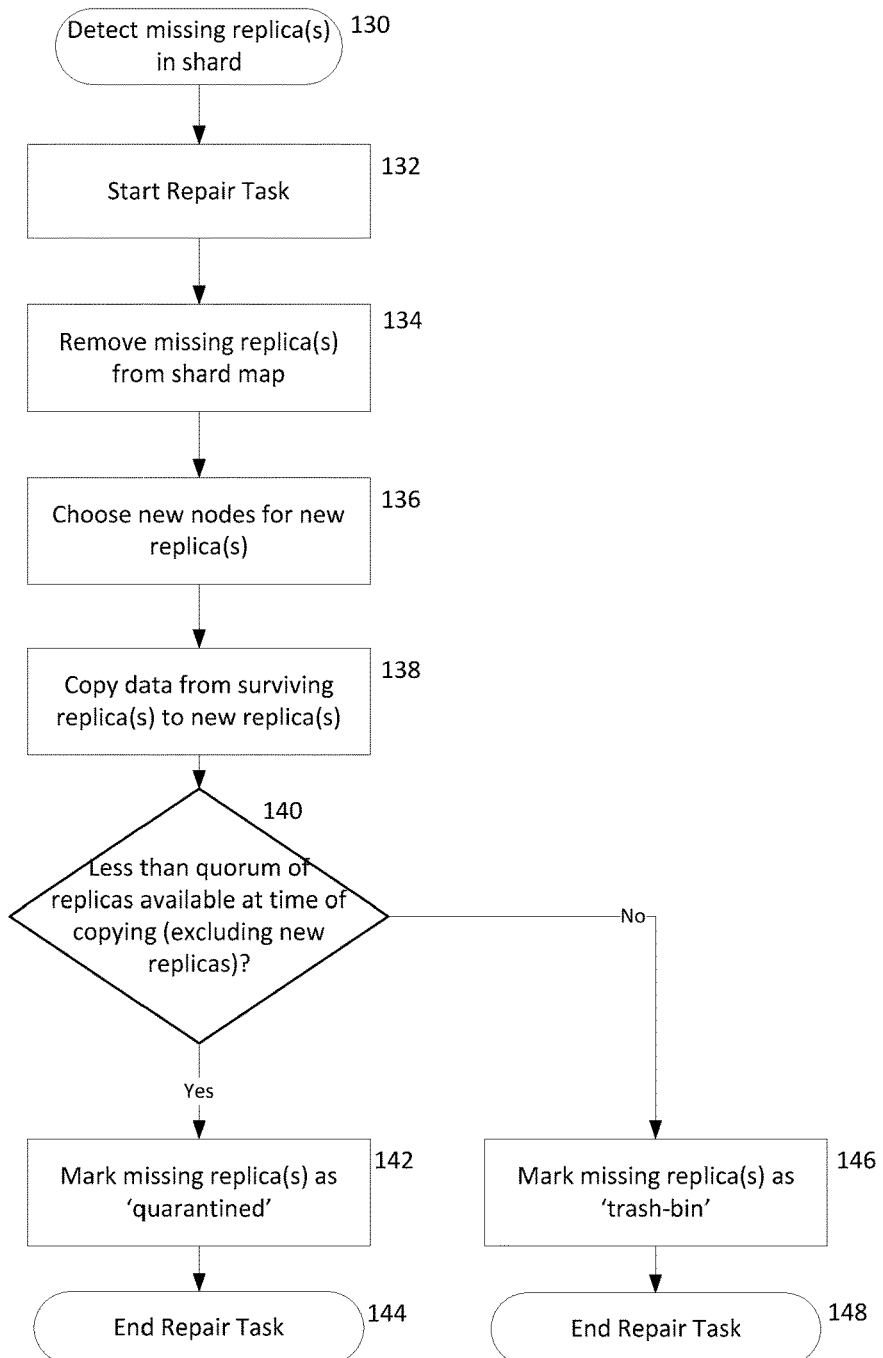
FIG. 1B is a flow diagram illustrating an embodiment of computer data storage technique a repair task.

In an alternate embodiment, shown in FIG. 1B, the determination of whether to mark missing replica(s) as "quarantined" or "trash-bin" is deferred until the step of copying data from surviving replica(s) to replacement replica(s) is successfully completed. Thus, similar to FIG. 1A, a repair task is started (130), missing replicas are removed from the shard map (134), new nodes are chosen to host new replicas (136), and the new replicas are synced with the surviving replicas (138). At 140, the system determines whether a quorum of replicas were available at the time of step 138. If so, then the missing replicas can be marked as "trash-bin" (146); if not, they are marked as "quarantined" (142). The repair task ends at 144 or 148, as applicable.

Waiting to make the determination of whether a quorum is available (140) ensures that the correct determination is made—e.g., in the event that a replica becomes unavailable between the time the repair task is started and the time that the data is copied over—because if an additional replica(s) does down during this interim time, it may change the answer to be that a quorum of replicas actually was not available, so that the missing replicas should be marked "quarantined".

As a concrete teaching example, which will continue to be used below for illustration, consider a shard 1 that has five replicas {A, B, C, D, E} and three replicas required for a quorum. Assume that it is missing four replicas, B, C, D, E with one surviving replica A. At the end of a repair operation, shard 1 will have new replicas F, G, H, and I, whose contents are replicated from A. Replicas B, C, D and E are marked quarantined.

Resolving Quarantines

The presence of quarantined replicas means some data in the shard may not be available. Thus, quarantines should be resolved quickly. In one embodiment, whenever a node containing one or more quarantined replicas becomes alive again (e.g., as indicated by a heartbeat message, communication success, system monitoring, or the like), a "resolve quarantine" task is started. In this task, the worker will replicate data from a quarantined (but now alive) replica to a current replica. Continuing the previous example, assume quarantined replica B is resurrected. Its contents are replicated to one of {A, F, G, H, I}. Once its contents are in one of those replicas, the database's synchronization mechanism will replicate to the other replicas. For example, the contents of B might be replicated to A, and then A is synchronized with F, G, H, and I.

Typically the shard (and each replica) is versioned, and has a version history as changes are made. If some content in B is outdated, the replication to A will be superseded by the newer contents in A due to the newer revision numbers in A. However, a problem can arise if content has been purged from A (e.g., purging to removing deleted files and associated revision history in A) and this content is in B. In this case, the replication from B to A will bring back obsolete data (that is, the versions in B that were purged from A). This problem can be prevented by not purging a shard that has quarantined replicas, and instead queuing such purge requests. Once the quarantine is resolved, the purge can be performed.

Continuing the teaching example, after B's contents are replicated to A, the worker marks B as "in trash-bin" instead of "quarantined". This allows B's storage space to be reclaimed. Note that we still have a quorum of replicas in shard 1 that are quarantined (A and B are alive; C, D, E are still quarantined). That means there may still be some unique updates that reside only in one (or all) of C, D and E. Thus they remain under quarantine.

Now if another node that contains one of C, D, or E becomes alive and that quarantined replica is also resolved, e.g., in the same manner that replica B was resolved, then there will be less than a quorum of replicas left in quarantine, as only two replicas will remain in quarantine. These remaining quarantined replicas do not contain any unique data anymore. Therefore, these less-than-quorum quarantined replicas can be automatically marked "in trash-bin" and the quarantines in this shard is now totally resolved.

Figure 2:
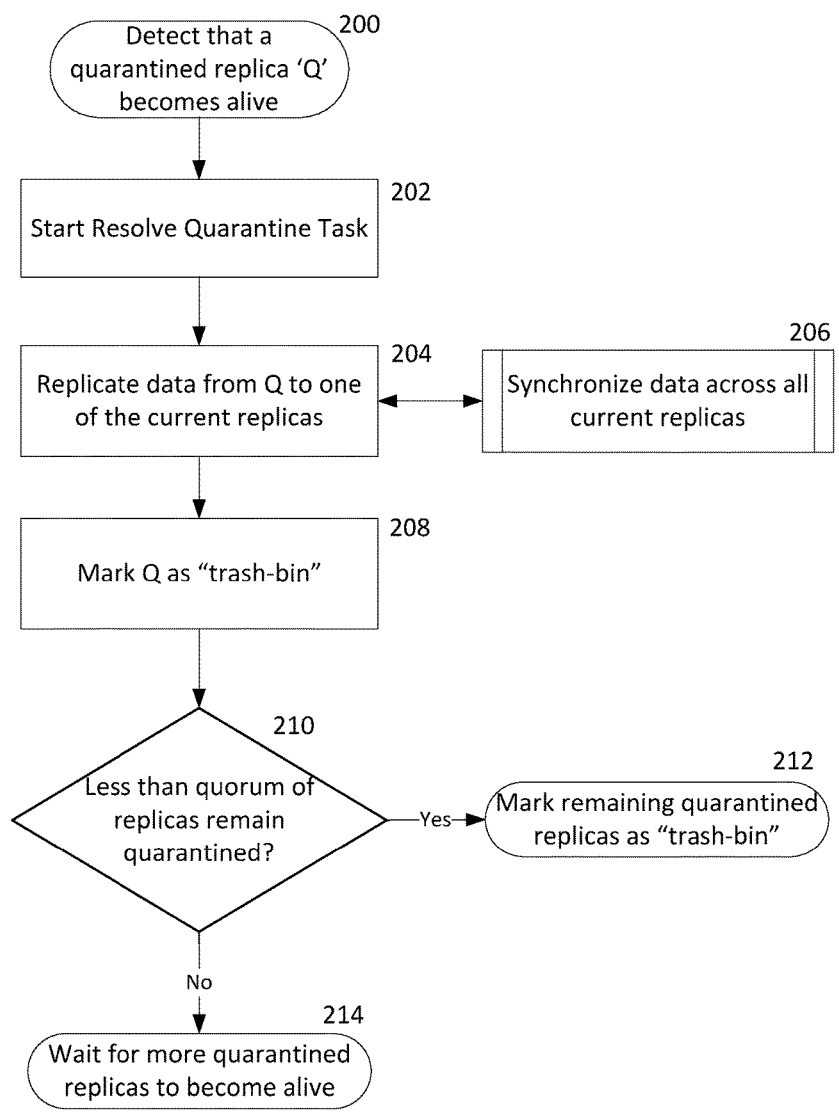
FIG. 2 is a flow diagram illustrating an embodiment of a computer data storage technique to resolve quarantine task; and, FIG. 3 is a block diagram illustrating hardware in a computer system that may be used to implement the teachings hereof.

FIG. 2 illustrates an embodiment of the above-described "resolve quarantine" task. At 200, the system detects that a particular quarantined replica "Q" is now available. The resolve quarantine task is started at 202, in which data in Q is replicated to at least one of the current replicas in the shard (204); ultimately that data is copied across to the other replicas in the shard (206). Replica Q is marked as "trash-bin" (208). At 210, a test is performed to determine whether less than a quorum of replicas remain quarantined; if less than quorum remains, the remaining quarantined replicas can be marked "trash-bin" (212), and the shard is resolved. If a quorum or more of replicas remain quarantined, the system must wait for more replicas to become alive (214).

Identifying the Quarantine Generation

It is possible that before an existing set of quarantined replicas are totally resolved, one of the current replicas in the shard may become missing. Assume, for example, that after B's quarantine status is removed, replicas F, G, H become unavailable, so that the shard has: A and B alive, F, G, H, unavailable, and C, D, E still quarantined. A second repair task will be started. The worker for the second repair task will mark replicas F, G, and H quarantined. However, we need to distinguish the quarantine set of {C, D, E} from the quarantine set of {F, G, H} because, they contain a different set of unique updates. If and when quarantined replica C is resolved, then D and E can be automatically taken out of quarantine and deleted—because D and E are less than the quorum for the replica set of {A, B, C, D, E} from which they came—but the same is not true for any of F, G and H. The reverse situation is treated likewise: if quarantined replica F is resolved, then G and H can be automatically taken out of quarantine and deleted—because G and H are less than the quorum for replica set {A, B, F, G, H} from which they came—but the same is not true for any of C, D, E, which must remain in quarantine.

Quarantine sets can be distinguished from another by a generation number or other identifier. In one embodiment, the timestamp of the repair task that put replicas in the quarantined state is used as the quarantine generation number. When marking a replica quarantined, it can be marked "quarantined @ts" where 'ts' is the aforementioned timestamp. (Notwithstanding the foregoing example, those skilled in the art will recognize that any unique numbering system can be used as the quarantine generation number.) When the number of members of a given quarantine set is less than a quorum, the remaining members can be automatically taken out of quarantine.

Alternative Embodiment

During a repair task, it is possible to mark only a (m−(quorum−1)) number of unavailable replicas as quarantined, where m is the number of unavailable replicas and 'quorum' is the number required for a quorum. This is an alternative to marking all unavailable replicas as quarantined. This approach works because unique updates will reside in (m—(quorum−1)) of the 'm' unavailable replicas.

Reconsidering the teaching example given above in which replica set {A, B, C, D, E} has replica A surviving and B, C, D, E become unavailable, we only need to mark (4−(3−1))=2 of the 4 unavailable replicas quarantined. For example, we only need to mark B and C (or any other pair) quarantined because B, C (or any other pair) and the surviving replica A will form a quorum and so one of them must have every unique update.

In contrast to the prior embodiment, with the alternative embodiment a replica is taken out of quarantine only after its data are replicated to a current shard replica and it is resolved. Quarantined replicas are not automatically taken out of quarantine because there is less than a quorum of quarantined replicas remaining, as in the prior embodiment.

By way of illustration with respect to FIG. 2, in the alternative embodiment, the evaluation at step 210 would be eliminated (and 212 too); instead, step 208 would proceed to 214.

The prior embodiment is preferred over the alternative embodiment (though either can be used). The preference comes because in the preferred embodiment, when any (m−(quorum−1)) quarantined replicas comes back alive, the whole set is totally resolved. In the alternative embodiment, the specific, pre-selected (m−(quorum−1)) replicas must all come back alive before the quarantine set is totally resolved. The preferred embodiment therefore has a higher probability of resolving earlier than the alternative, which improves data availability. The alternative may nevertheless offer some simplification in that it reduces the number of quarantined replicas that must be monitored and/or managed.

Use in Distributed Data for Cloud Storage

The teachings hereof can be applied in, among other things, distributed storage systems and services to provide a cloud storage solution. For example a content delivery network (CDN) may utilize distributed storage to provide a network storage subsystem, which may be located in a network datacenter accessible to CDN proxy cache servers and which may act as a source/origin of content for content to be delivered through such CDN servers to requesting end user client devices, such as is described in U.S. Pat. No. 7,472,178, the disclosure of which is incorporated herein by reference. In this regard, a network storage system may be indexed by distributed databases that map input keys to data that points to storage locations in the manner of a file lookup service; the distributed database can leverage the teachings hereof. In this way, the teachings hereof can be applied to provide replicated, quorum-based storage of Internet content, such as images, HTML, streaming media files, software, and other digital objects, and to provide a managed network storage service with replicated storage sites as part of a CDN infrastructure.

Computer Based Implementation

The subject matter described herein is generally implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 3:
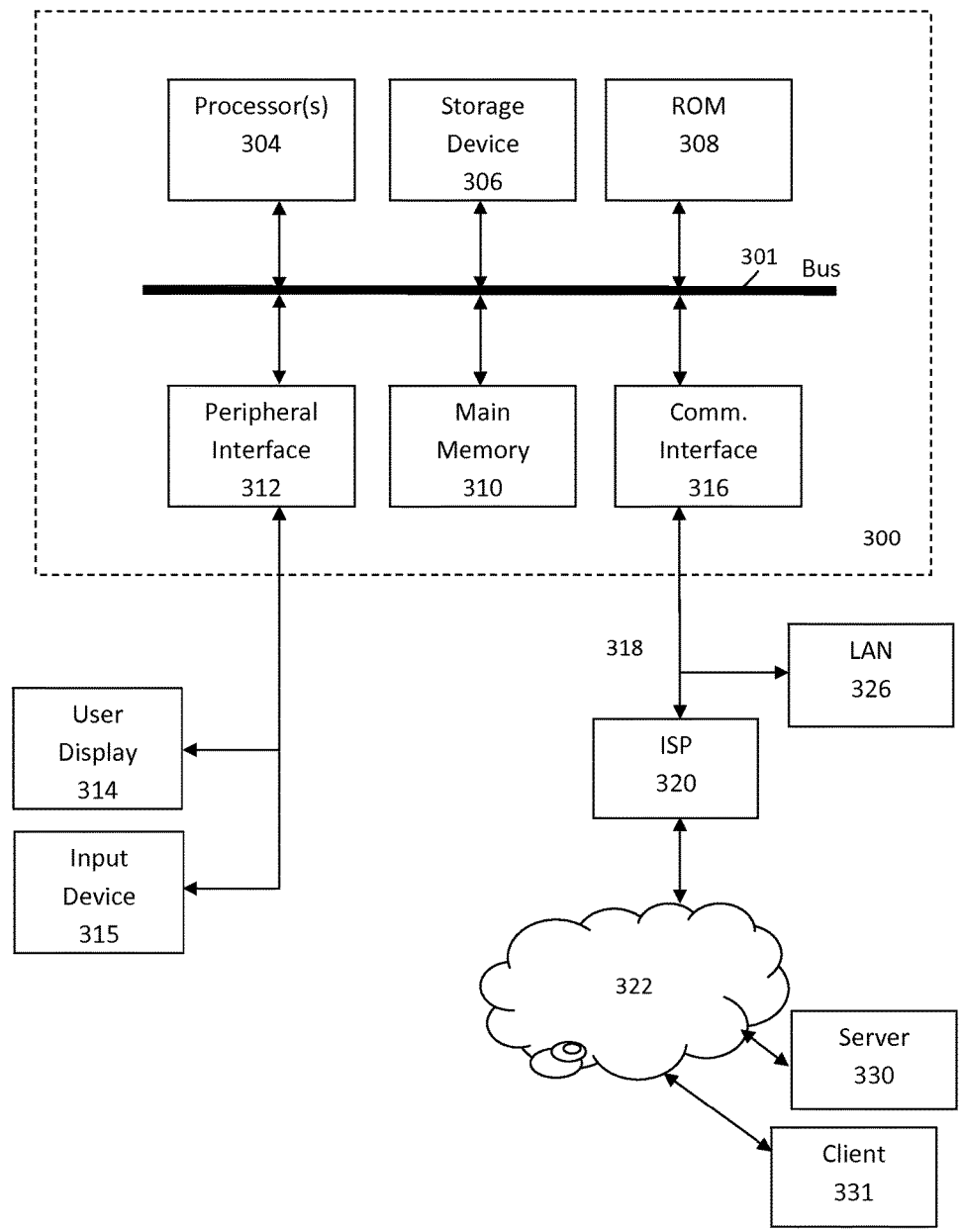

FIG. 3 is a block diagram that illustrates hardware in a computer system 300 on which embodiments of the invention may be implemented. The computer system 300 may be embodied in a client device, server, personal computer, workstation, tablet computer, wireless device, mobile device, network device, router, hub, gateway, or other device.

Computer system 300 includes a microprocessor 304 coupled to bus 301. In some systems, multiple microprocessor and/or microprocessor cores may be employed. Computer system 300 further includes a main memory 310, such as a random access memory (RAM) or other storage device, coupled to the bus 301 for storing information and instructions to be executed by microprocessor 304. A read only memory (ROM) 308 is coupled to the bus 301 for storing information and instructions for microprocessor 304. As another form of memory, a non-volatile storage device 306, such as a magnetic disk, solid state memory (e.g., flash memory), or optical disk, is provided and coupled to bus 301 for storing information and instructions. Other application-specific integrated circuits (ASICs), field programmable gate arrays (FPGAs) or circuitry may be included in the computer system 300 to perform functions described herein.

Although the computer system 300 is often managed remotely via a communication interface 316, for local administration purposes the system 300 may have a peripheral interface 312 communicatively couples computer system 300 to a user display 314 that displays the output of software executing on the computer system, and an input device 315 (e.g., a keyboard, mouse, trackpad, touchscreen) that communicates user input and instructions to the computer system 300. The peripheral interface 312 may include interface circuitry and logic for local buses such as Universal Serial Bus (USB) or other communication links.

Computer system 300 is coupled to a communication interface 316 that provides a link between the system bus 301 and an external communication link. The communication interface 316 provides a network link 318. The communication interface 316 may represent an Ethernet or other network interface card (NIC), a wireless interface, modem, an optical interface, or other kind of input/output interface.

Network link 318 provides data communication through one or more networks to other devices. Such devices include other computer systems that are part of a local area network (LAN) 326. Furthermore, the network link 318 provides a link, via an internet service provider (ISP) 320, to the Internet 322. In turn, the Internet 322 may provide a link to other computing systems such as a remote server 330 and/or a remote client 331. Network link 318 and such networks may transmit data using packet-switched, circuit-switched, or other data-transmission approaches.

In operation, the computer system 300 may implement the functionality described herein as a result of the microprocessor executing program code. Such code may be read from or stored on a non-transitory computer-readable medium, such as memory 310, ROM 308, or storage device 306. Other forms of non-transitory computer-readable media include disks, risk arrays, RAID arrays, solid-state memory and arrays thereof, tapes, magnetic media, CD-ROMs, optical media, RAM, PROM, EPROM, and EEPROM. Any other non-transitory computer-readable medium may be employed. Executing code may also be read from network link 318 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

Those skilled in the art will understand that the teachings above provide improvements to the functioning of computer systems themselves and in particular to the data persistence, reliability, and performance of a distributed data storage system.

The invention claimed is:

1. A method for improving data persistence and availability in a distributed data store where data is stored in a plurality of shards and a given shard is replicated across a plurality of nodes in the distributed data store so as to create a plurality of replicas, where a quorum of replicas is needed for access to the given shard, the method performed by the data distributed data store, the method comprising:
   detecting that a particular replica of the plurality of replicas associated with the given shard is unavailable;
   in response to said detection, determining whether the available replicas of the plurality of replicas for the given shard represent a quorum, based on a configuration that requires a minimum number of available replicas in the given shard for the available replicas to qualify to be a quorum, and in response to said determination, taking one of the following two actions:
   (a) upon a determination that the available replicas of the plurality of replicas for the given shard do not represent a quorum, marking the particular replica as quarantined; and
   (b) upon a determination that the available replicas of the plurality of replicas for the given shard do represent a quorum, marking the particular replica to be deleted;
   upon the distributed data store marking the particular replica as quarantined, the method further comprising, with the distributed data store:
   subsequent to marking the particular replica as quarantined, receiving a purge request to purge data in one or more of the available replicas of the given shard;
   in response to the purge request, queuing the purge request instead of purging the data in the one or more of the available replicas of the given shard, based at least in part on the particular replica having a quarantined status;

queuing the purge request at least until the distributed data store determines that there are less than a quorum of unavailable replicas left in quarantine in the shard.

2. The method of claim 1, further comprising:
selecting a node to host a new replica for the given shard;
copying data from an available replica of the plurality of replicas for the given shard to the new replica.

3. The method of claim 2, wherein the step of copying occurs before the step of determining whether the available replicas of the plurality of replicas for the given shard represent a quorum, wherein the number of available replicas of the plurality of replicas for the given shard does not include the new replica.

4. The method of claim 2, wherein the step of copying occurs after the step of determining whether the available replicas of the plurality of replicas for the given shard represent a quorum, wherein the number of available replicas of the plurality of replicas for the given shard the given shard does not include the new replica.

5. The method of claim 1, further comprising:
marking the particular replica with a quarantine generation identifier.

6. A data storage system with improved operation, comprising:
a plurality of distributed nodes, each node comprising a microprocessor and memory storing instructions to be executed on the microprocessor for operating of that node, the plurality of nodes including a plurality of storage nodes each storing at least one replica of a shard so as to create a plurality of replicas;
one or more processes executing on one or more of the plurality of nodes to detect and handle faults in replicas, the one or more processes executing the following steps:
detecting that a particular replica of the plurality of replicas associated with the shard is unavailable;
in response to said detection, determining whether the available replicas of the plurality of replicas for the shard represent a quorum, based on a configuration that requires a minimum number of available replicas in the given shard for the available replicas to qualify to be a quorum, and in response to said determination, taking one of the following two actions:
(a) upon a determination that the available replicas of the plurality of replicas do not represent a quorum, marking the particular replica as quarantined;
(b) upon a determination that the available replicas of the plurality of replicas do represent a quorum, marking the particular replica to be deleted;
upon the one or more processes marking the particular replica as quarantined, the method further comprising, with the distributed data store;
subsequent to marking the particular replica as quarantined, receiving a purge request to purge data in one or more of the available replicas of the given shard;
in response to the purge request, queuing the purge request instead of purging the data in the one or more of the available replicas of the given shard, based at least in part on the particular replica having a quarantined status;
queuing the purge request at least until the one or more processes determine that there are less than a quorum of unavailable replicas left in quarantine in the shard.

7. The system of claim 6, the one or more processes further executing the following steps:
selecting a node to host a new replica for the given shard;
copying data from an available replica of the plurality of replicas for the given shard to the new replica.

8. The system of claim 7, wherein the step of copying occurs before the step of determining whether the available replicas of the plurality of replicas for the given shard represent a quorum, wherein the number of available replicas of the plurality of replicas for the given shard does not include the new replica.

9. The system of claim 7, wherein the step of copying occurs after the step of determining whether the available replicas of the plurality of replicas for the given shard represent a quorum, wherein the number of available replicas of the plurality of replicas for the given shard does not include the new replica.

10. The system of claim 6, the one or more processes further executing the following step:
marking the particular replica with a quarantine generation identifier.

11. A data storage system with improved operation, comprising:
a plurality of distributed nodes, each node comprising means for operating that node, the plurality of nodes including a plurality of storage nodes each storing at least one replica of a shard so as to create a plurality of replicas;
means for detecting that a particular replica of the plurality of replicas associated with the shard is unavailable;
means for, in response to said detection, determining whether the available replicas of the plurality of replicas for the shard represent a quorum, based on a configuration that requires a minimum number of available replicas in the given shard for the available replicas to qualify to be a quorum, and in response to said determination, taking one of the following two actions:
(a) means for, upon a determination that the available replicas of the plurality of replicas do not represent a quorum, marking the particular replica as quarantined;
(b) means for, upon a determination that the available replicas of the plurality of replicas do represent a quorum, marking the particular replica to be deleted;
means for, upon marking the particular replica as quarantined, the method further comprising, with the distributed data store:
means for, subsequent to marking the particular replica as quarantined, receiving a purge request to purge data in one or more of the available replicas of the given shard;
mean for, in response to the purge request, queuing the purge request instead of purging the data in the one or more of the available replicas of the given shard, based at least in part on the particular replica having a quarantined status;
mean for queuing the purge request at least until a determination that there are less than a quorum of unavailable replicas left in quarantine in the shard.

12. The system of claim 11, further comprising:
means for selecting a node to host a new replica for the given shard;

means for copying data from an available replica of the plurality of replicas for the given shard to the new replica.

13. The system of claim 12, wherein the step of copying occurs before the step of determining whether the available replicas of the plurality of replicas for the given shard represent a quorum, wherein the number of available replicas of the plurality of replicas for the given shard does not include the new replica.

14. The system of claim 12, wherein the step of copying occurs after the step of determining whether the available replicas of the plurality of replicas for the given shard represent a quorum, wherein the number of available replicas of the plurality of replicas for the given shard does not include the new replica.

15. The system of claim 11, further comprising:
means for marking the particular replica with a quarantine generation identifier.

* * * * *